United States Patent
Araki

(10) Patent No.: US 10,807,838 B2
(45) Date of Patent: Oct. 20, 2020

(54) APPARATUS FOR PREVENTING REMOTE OPERATION TERMINAL FROM BEING MISLAID, REMOTE OPERATION TERMINAL, AND SYSTEM FOR PREVENTING REMOTE OPERATION TERMINAL FROM BEING MISLAID

(71) Applicant: TADANO LTD., Kagawa (JP)

(72) Inventor: Yuji Araki, Kagawa (JP)

(73) Assignee: TADANO LTD., Kagawa (JP)

( * ) Notice: Subject to any disclaimer, the term of this patent is extended or adjusted under 35 U.S.C. 154(b) by 0 days.

(21) Appl. No.: 16/608,572

(22) PCT Filed: Apr. 26, 2018

(86) PCT No.: PCT/JP2018/017065
§ 371 (c)(1),
(2) Date: Oct. 25, 2019

(87) PCT Pub. No.: WO2018/199260
PCT Pub. Date: Nov. 1, 2018

(65) Prior Publication Data
US 2020/0140240 A1 May 7, 2020

(30) Foreign Application Priority Data
Apr. 27, 2017 (JP) ................. 2017-087832

(51) Int. Cl.
*H04W 4/00* (2018.01)
*B66C 13/44* (2006.01)
(Continued)

(52) U.S. Cl.
CPC .............. *B66C 13/44* (2013.01); *B66C 15/00* (2013.01); *H04B 17/318* (2015.01)

(58) Field of Classification Search
CPC ................................... H04W 4/00; G06F 1/00
See application file for complete search history.

(56) References Cited

U.S. PATENT DOCUMENTS

2012/0015618 A1* 1/2012 Heikkinen ........ H04M 1/72522
455/230
2018/0148303 A1 5/2018 Hayashi

FOREIGN PATENT DOCUMENTS

| JP | 2006-197377 A | 7/2006 |
| JP | 2006-290487 A | 10/2006 |

(Continued)

OTHER PUBLICATIONS

Aug. 7, 2018, International Search Report issued for related PCT Application No. PCT/JP2018/017065.

(Continued)

*Primary Examiner* — Shirley Lu
(74) *Attorney, Agent, or Firm* — Paratus Law Group, PLLC

(57) ABSTRACT

An apparatus for preventing a remote operation terminal from being mislaid, the remote operation terminal remotely operating a work machine driven via a PTO device in a vehicle, the apparatus being configured so as to have: a reception device for receiving a wireless signal transmitted by a transmission device provided to the remote operation terminal, the reception device being provided to the vehicle; a determination section that, when the PTO device is in an OFF state, determines whether or not the reception strength of the wireless signal received from the transmission device by the reception device is equal to or less than a prescribed threshold value; and a notification section for issuing a notification when the reception strength is equal to or less than the prescribed threshold value.

10 Claims, 7 Drawing Sheets

(51) Int. Cl.
*H04B 17/318* (2015.01)
*B66C 15/00* (2006.01)

(56) References Cited

FOREIGN PATENT DOCUMENTS

| | | | |
|---|---|---|---|
| JP | 2006290487 A | * | 10/2006 |
| JP | 2007-182309 A | | 7/2007 |
| JP | 2008-160743 A | | 7/2008 |
| JP | 2016-185833 A | | 10/2016 |
| JP | 2017-012693 A | | 1/2017 |
| JP | 2017-055344 A | | 3/2017 |
| JP | 2017-071481 A | | 4/2017 |
| WO | WO 2007/026745 A1 | | 3/2007 |

OTHER PUBLICATIONS

Aug. 7, 2018, International Search Opinion issued for related PCT Application No. PCT/JP2018/017065.

* cited by examiner

APPARATUS FOR PREVENTING REMOTE OPERATION TERMINAL FROM BEING MISLAID, REMOTE OPERATION TERMINAL, AND SYSTEM FOR PREVENTING REMOTE OPERATION TERMINAL FROM BEING MISLAID

CROSS REFERENCE TO PRIOR APPLICATION

This application is a National Stage Patent Application of PCT International Patent Application No. PCT/JP2018/017065 (filed on Apr. 26, 2018) under 35 U.S.C. § 371, which claims priority to Japanese Patent Application No. 2017-087832 (filed on Apr. 27, 2017), which are all hereby incorporated by reference in their entirety.

TECHNICAL FIELD

The present invention relates to an apparatus for preventing a remote operation terminal, used for a work vehicle such as a mobile crane, from being mislaid, a remote operation terminal, and a system for preventing a remote operation terminal from being mislaid.

BACKGROUND ART

In recent years, a work vehicle including a mobile crane is often remotely operated by using a remote operation terminal. This remote operation terminal is used by an operator at a position away from the work vehicle. For this reason, the remote operation terminal may be mislaid in a work site after the work has been completed. In order to prevent the remote operation terminal from being mislaid as described above, a mislay alarm system has been developed.

For example, Patent Literature 1 discloses a mislay alarm system for a remote operation device for a railroad vehicle. The system is configured to issue an alert when the remote operation device is not stored in a storage location. According to such a configuration, it is possible to prevent the remote operation device from being mislaid when the vehicle travels on a track.

CITATION LIST

Patent Literature

Patent Literature 1: JP-A-2016-185833

SUMMARY OF THE INVENTION

Problems to be Solved by the Invention

However, the mislay alarm system disclosed in Patent Literature 1 requires that a storage unit be installed at a specially prepared position in the rail car, and the remote operation device be stored in the storage location. Therefore, the system is not applicable to work vehicles (including a truck loader crane) with no storage location for the remote operation terminal defined.

An object of the present invention is to provide an apparatus for preventing a remote operation terminal a storage location for which in a work vehicle is not defined from being mislaid, a remote operation terminal, and a system for preventing a remote operation terminal from being mislaid.

Solutions to Problems

An apparatus for preventing a remote operation terminal from being mislaid according to the present invention is an apparatus for preventing a remote operation terminal from being mislaid, the remote operation terminal remotely operating a work machine driven via a PTO device in a vehicle, the apparatus including: a reception device that receives a wireless signal transmitted by a transmission device provided to the remote operation terminal, the reception device being provided to the vehicle; a determination section that, when the PTO device is in an OFF state, determines whether a reception strength of the wireless signal received from the transmission device by the reception device is equal to or less than a prescribed threshold value; and a notification section that issues a notification when the reception strength is equal to or less than the prescribed threshold value.

A remote operation terminal according to the present invention is a remote operation terminal for remotely operating a work machine driven via a PTO device in a vehicle, the remote operation terminal comprising: a remote operation section that includes an operation input section for inputting an operation instruction to the work machine, a control section that generates an operation signal based on the operation instruction input from the operation input section, and an operation signal transmission section that transmits the operation signal to the work machine; and a transmission section that transmits a wireless signal at a frequency different from a frequency of the operation signal.

A system for preventing a remote operation terminal from being mislaid according to the present invention includes: the remote operation terminal that remotely operates a work machine driven via a PTO device in a vehicle; a transmission device that is provided to the remote operation terminal; a reception device that receives a wireless signal transmitted by the transmission device, the reception device being provided to the vehicle; a determination section that, when the PTO device is in an OFF state, determines whether a reception strength of the wireless signal received from the transmission device by the reception device is equal to or less than a prescribed threshold value; and a notification section that issues a notification when the reception strength is equal to or less than the prescribed threshold value.

Effects of the Invention

The present invention can provide an apparatus for preventing a remote operation terminal a storage location for which in a work vehicle is not defined from being mislaid, a remote operation terminal, and a system for preventing a remote operation terminal from being mislaid.

DESCRIPTION OF EMBODIMENTS

Hereinafter, an embodiment of the present invention will be described with reference to the drawings. An apparatus for preventing a remote operation terminal from being mislaid, a remote operation terminal, and a system for preventing a remote operation terminal from being mislaid according to the present invention can be applied to a work vehicle such as a mobile crane, an aerial work platform, a wheel loader, or a hydraulic shovel.

The mobile crane includes a truck crane (in the narrow sense), a truck loader crane (mounted on a vehicle), and a tow truck crane. The mobile crane includes a truck crane (in a broad sense), a wheel crane (in a narrow sense), and a rough terrain crane. Furthermore, the mobile cranes include a wheel crane (in a broad sense), a crawler crane, a railway crane, and a floating crane. The present invention can be applied to such various mobile cranes. Hereinafter, although a description will be given by taking a truck loader crane as an example, the apparatus for preventing a remote operation terminal from being mislaid, the remote operation terminal, and the system for preventing a remote operation terminal from being mislaid according to the present invention can be applied to other work vehicles.

Embodiment

An apparatus for preventing a remote operation terminal from being mislaid, a remote operation terminal, and a system for preventing a remote operation terminal from being mislaid according to an embodiment of the present invention will be described below with reference to FIGS. 1 to 7.

Overall Configuration of Truck Loader Crane

Figure 1:
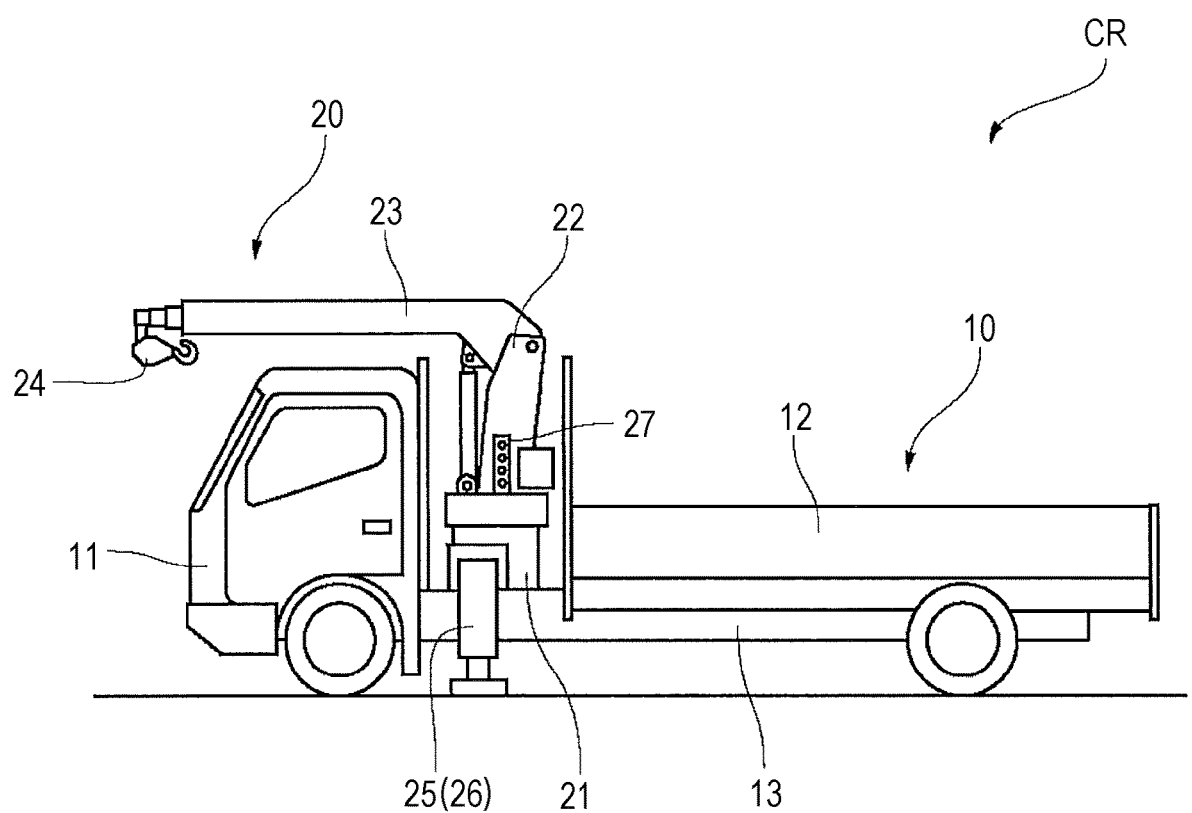
FIG. 1 is a side view of a truck loader crane according to an embodiment of the present invention.

First of all, a configuration of a truck loader crane CR will be described. As illustrated in FIG. 1, the truck loader crane CR includes a general-purpose truck 10 and a small crane 20.

The small crane 20 is mounted on a vehicle frame 13 arranged between a cabin 11 and a bed 12 of the general-purpose truck 10.

The small crane 20 has a base 21, a post 22, and a boom 23.

The base 21 is fixed on the vehicle frame 13. The post 22 is provided to be swivelable with respect to the base 21. The boom 23 is provided at the upper end of the post 22 so as to be capable of being raised and lowered.

The post 22 incorporates a winch (not illustrated). A wire rope is led from the winch to the tip of the boom 23. This wire rope is wound around the hook 24 via a pulley at the tip of the boom 23. The post 22, boom 23, and the hook 24 form a crane apparatus.

Furthermore, the small crane 20 includes outrigger devices 25 and 26 on both left and right sides of the base 21. Hereinafter, the crane apparatus (the post 22, the boom 23, and the hook 24) and the outrigger devices 25 and 26 are collectively referred to as a "work machine".

The small crane 20 has a group of levers 27, for operating these work machines, on both left and right sides of the base 21. Here, the crane apparatus (the post 22, the boom 23, and the hook 24) and the outrigger devices 25 and 26 are described as an example of the work machine. However, the work machine is not limited to this. For example, the work machine may be a work machine that is hydraulically driven via a PTO 30 described later. The configuration of the present embodiment can be applied to such various work machines.

Configuration of Hydraulic System and Control System

Figure 2:
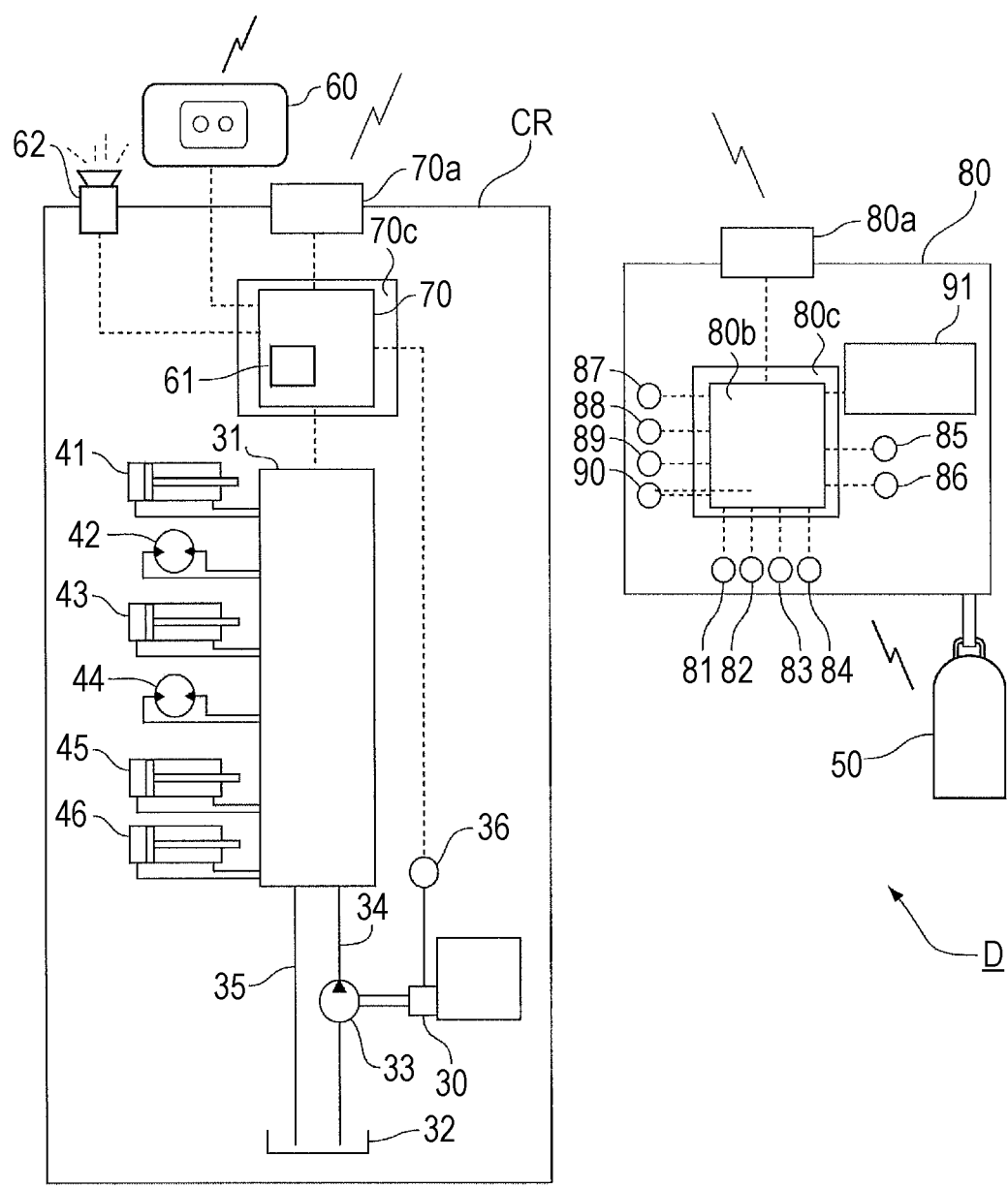
FIG. 2 is a block diagram of a control system for the truck loader crane.

As illustrated in FIG. 2, the hydraulic system of the small crane 20 mainly includes a hydraulic valve unit 31, a hydraulic pump 33, a main oil passage 34, a return oil passage 35, and a plurality of hydraulic actuators 41 to 46.

The hydraulic pump 33 supplies hydraulic oil from a tank 32 to the hydraulic valve unit 31. The main oil passage 34 connects the hydraulic pump 33 and the hydraulic valve unit 31 to each other. The return oil passage 35 connects the hydraulic valve unit 31 and the tank 32 to each other. The plurality of hydraulic actuators 41 to 46 are connected to the hydraulic valve unit 31.

Among these, the hydraulic pump 33 is rotationally driven with rotational force of an engine extracted via the PTO 30. In the present embodiment, the PTO 30 is connected to a PTO detector 36 that detects ON/OFF of the PTO 30.

Note that the PTO detector 36 may not be directly connected to the PTO 30. The PTO detector 36 may exist as a functional section in a control device 70 and acquire ON/OFF instruction information about the PTO 30.

The hydraulic valve unit 31 is connected to hydraulic actuators including a boom expansion/contraction hydraulic cylinder 41, a winch hydraulic motor 42, a boom raising/lowering hydraulic cylinder 43, a rotation hydraulic motor 44, and outrigger hydraulic cylinders 45 and 46.

Each of switching control valves (not illustrated) forming the hydraulic valve unit 31 is provided with a lever. By manually operating these levers, the direction and flow rate of the pressure oil supplied from the hydraulic pump 33 are switched. The levers attached to the switching control valves are arranged on left and right sides of the base 21 as the group of levers 27 (see FIG. 1).

Furthermore, pilot cylinders are attached to the switching control valves separately from the levers. The direction and flow rate of the pressure oil supplied from the hydraulic pump 33 are also switched by an operation of such pilot cylinders.

Each pilot cylinder is provided with a solenoid valve. The solenoid valve is connected to a control device 70 including a known computer or the like. The solenoid valve operates based on a control signal from the control device 70, thereby driving the pilot cylinder and switching the switching control valve. In this way, the control device 70 controls the operation of the work machine.

Such a control device 70 is mounted on a substrate 70c such as a printed circuit board incorporated in the work machine. The control device 70 is connected to a work machine side communication section 70a that receives an operation signal from the remote operation terminal 80. Such a work machine side communication section 70a may be mounted on the substrate 70c. The work machine side communication section 70a sends the operation signal, received from the remote operation terminal 80, to the control device 70.

The control device 70 controls the hydraulic valve unit 31 based on the operation signal received from the work machine side communication section 70a, to control supplying and discharging of pressure oil to and from the boom expansion/contraction hydraulic cylinder 41, the winch hydraulic motor 42, the boom raising/lowering hydraulic cylinder 43, the rotation hydraulic motor 44 and the outrigger hydraulic cylinders 45 and 46. As a result, the boom 23, the winch, the post 22, and the outrigger devices 25 and 26 are operated based on an operation signal from the remote operation terminal 80. As described above, the work machine can operate based on the operation instruction input from the lever group 27, and can operate based on the operation instruction input from the remote operation terminal 80.

Furthermore, a reception unit 60 that receives radio waves from a wireless transmission unit 50 described later is connected to the control device 70 of the present embodiment. The function of the reception unit 60 will be described later.

Remote Operation Terminal

The remote operation terminal 80 can perform bidirectional wireless or wired communications with the control device 70 of the work machine via a terminal side communication section 80a. Such a remote operation terminal 80 can remotely operate the work machine.

Figure 3:
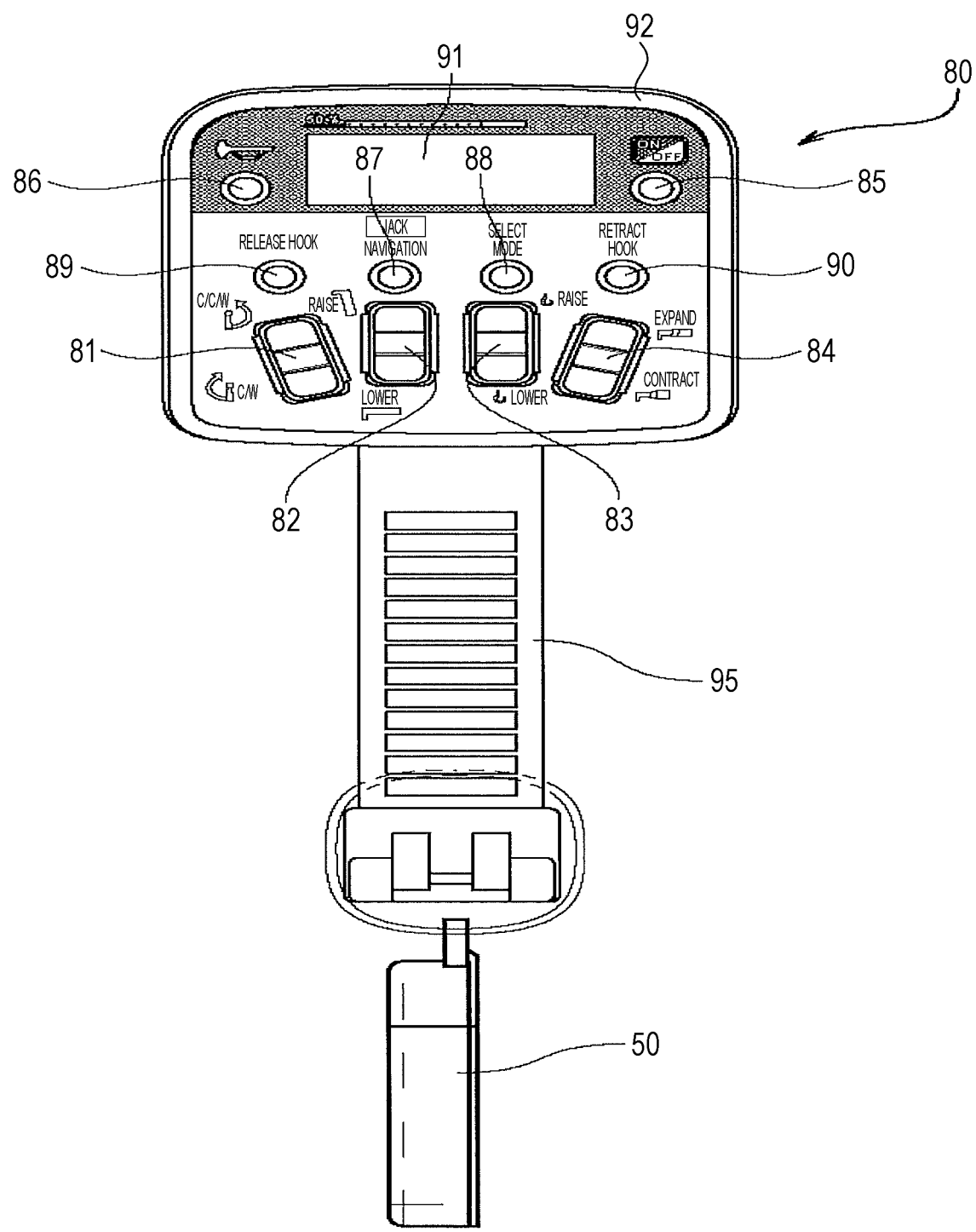
FIG. 3 is a front view of a remote operation terminal.

The remote operation terminal 80 includes a housing 92 and a grip portion 95. As illustrated in FIGS. 2 and 3, operation switches 81 to 90 such as various switches and levers, and a display section 91 which is a liquid crystal display are arranged in an upper portion of the remote operation terminal 80. The operation switches 81 to 90 are held by the housing 92.

Specifically, the operation switches 81 to 90 include a swiveling selection switch 81, a raising/lowering selection switch 82, a winch selection switch 83, an expansion/contraction selection switch 84, a power switch 85, a horn switch 86, a navigation switch 87, a mode selection switch 88, a hook release switch 89, a hook retraction switch 90, and the like.

Each of the above-described switches 81 to 90 is a switch (also referred to as an operation input section) used by an operator to input an operation instruction (hereinafter referred to as "operation input"). Each of the switches 81 to 90 is connected to the control section 80b. The control section 80b is mounted on a substrate 80c such as a printed circuit board provided in the housing 92 of the remote operation terminal 80.

The remote operation terminal 80 includes a terminal side communication section 80a (also referred to as an operation signal transmission section) connected to the work machine side communication section 70a of the work machine so as to be capable performing bidirectional wireless or wired communications. The terminal side communication section 80a is connected to the control section 80b. Note that the terminal side communication section 80a may be mounted on the substrate 80c.

The operation inputs input from the switches 81 to 90 are sent to the control section 80b. The control section 80b generates an operation signal based on the operation input received from each of the switches 81 to 90. Then, the control section 80b sends the operation signal to the terminal side communication section 80a. The terminal side communication section 80a transmits the received operation signal to the work machine (specifically, the work machine side communication section 70a). In this way, the work machine is remotely operated by the remote operation terminal 80. The switches 81 to 90 that are operation input sections, the control section 80b, and the terminal side communication section 80a that is an operation signal transmission section form a remote operator section.

Furthermore, the remote operation terminal 80 of the present embodiment is connected to the wireless transmission unit 50 (also referred to as a transmission section) that transmits (sends) radio waves (wireless signals). Specifically, the wireless transmission unit 50 is fastened to the grip portion 95 of the remote operation terminal 80 by fastening means such as a belt to be integrated with (so as not to be separated from) the remote operation terminal 80. The function of the wireless transmission unit 50 will be described later.

System for Preventing Mislay

Figure 5A:
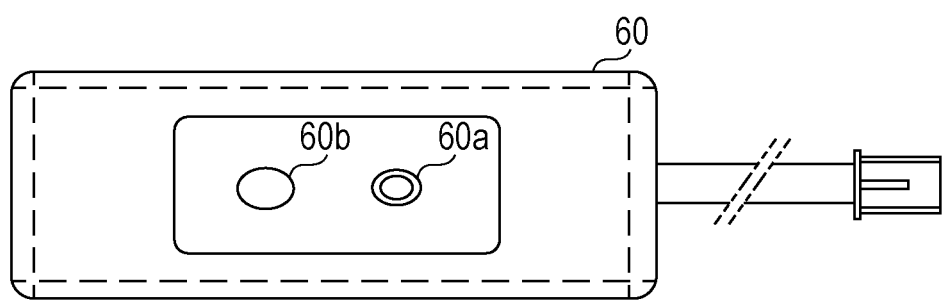
FIG. 5A is a plan view of a reception unit.

The system for preventing a remote operation terminal from being mislaid includes a work machine (the post 22, the boom 23, the hook 24, and the outrigger devices 25 and 26), the remote operation terminal 80, the wireless transmission unit 50, the reception unit 60, the PTO detector 36, a determination section 61, a notifier 62, and a notification stopper 60b (see FIG. 5A).

An apparatus D for preventing a remote operation terminal from being mislaid includes at least the reception unit 60, the notifier 62, and the notification unit 62. Further, the apparatus D for preventing the remote operation terminal from being mislaid may include the work machine (the post 22, the boom 23, the hook 24, and the outrigger devices 25 and 26), the PTO detector 36, the notification stopper 60b, and the like.

The work machine (the post 22, the boom 23, the hook 24, and the outrigger devices 25 and 26) are driven by the power of the engine extracted via the PTO 30.

Remote Operation Terminal

The remote operation terminal 80 is for remotely operating the work machine (the post 22, the boom 23, the hook 24, and the outrigger devices 25 and 26).

Wireless Transmission Unit

The wireless transmission unit 50 (also referred to as a transmission device) is connected to the remote operation terminal 80 and transmits (sends) radio waves (wireless signals). The frequency of the wireless signal is different from the frequency of the operation signal sent from the terminal side communication section 80a to the work machine. The wireless signal is transmitted from the wireless transmission unit 50 to the reception unit 60 provided to the work machine by one-way communication. Thus, the terminal side communication section 80a and the reception unit 60 are connected so as to be communicable by one-way communication. Such a configuration is effective for cost reduction because communication control can be simply configured. However, the wireless transmission unit 50 and the reception unit 60 may be connected so as to be communicable by bidirectional communication.

Figure 4A:
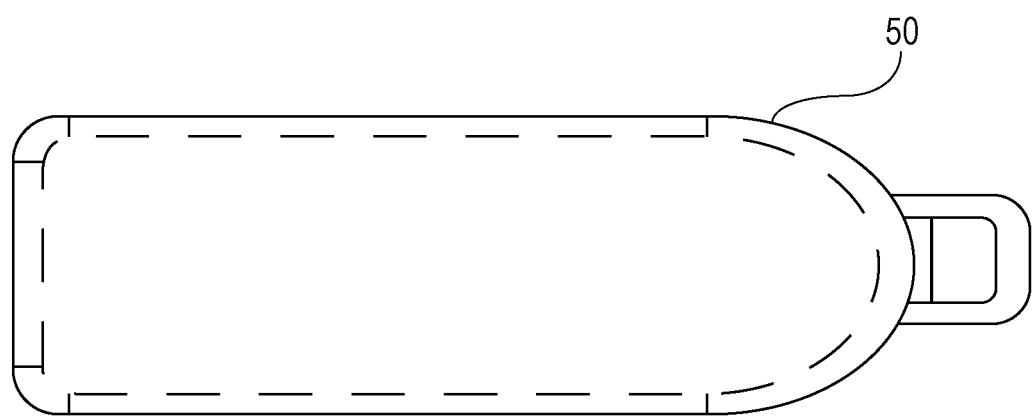
FIG. 4A is a plan view of a wireless transmission unit.
Figure 4B:
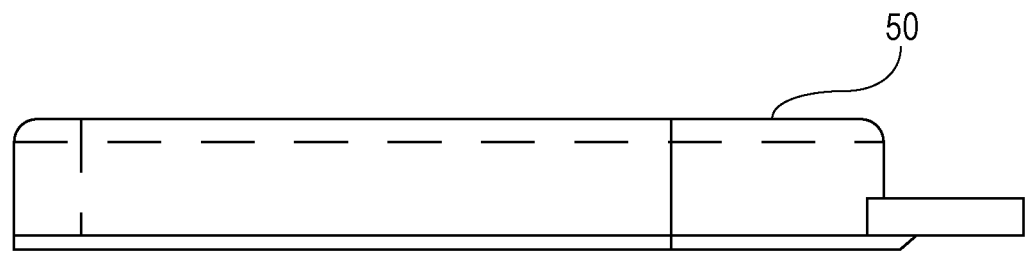
FIG. 4B is a side view of the wireless transmission unit.

As illustrated in FIGS. 3, 4A, and 4B, the wireless transmission unit 50 is accommodated in a small case and is provided separately from the remote operation terminal 80, but is fastened to the remote operation terminal 80 by fastening means such as a belt to be integrated with (so as not to be separated from) the remote operation terminal 80. The wireless transmission unit 50 uses a battery such as a lithium battery as a power source, and transmits a radio wave of a certain frequency at a prescribed radio wave strength and at a prescribed time interval (for example, once in every 1.5 seconds). Thus, the wireless transmission unit 50 transmits a wireless signal even when the power switch 85 of the remote operation terminal 80 is in an OFF state.

Here, the radio wave strength of the radio wave transmitted by the wireless transmission unit 50 is preferably configured to be selectable from a plurality of strengths (for example, five types of strengths) according to the environment in which it is used. As described above, the wireless transmission unit 50 intermittently transmits radio waves at a prescribed time interval, thereby notifying the reception unit 60, receiving the radio waves, of the distance to the remote operation terminal 80.

Reception Unit

The reception unit 60 (also referred to as a reception device) receives radio waves transmitted by the wireless transmission unit 50. Such a reception unit 60 is installed in any location of the work vehicle.

Figure 5B:
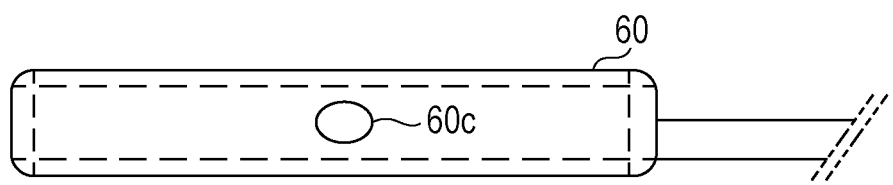
FIG. 5B is a side view of the reception unit.

Specifically, as illustrated in FIGS. 5A and 5B, the reception unit 60 is accommodated in a small case has a front surface provided with an LED 60a and the notification stopper 60b and has a side surface provided with a pairing switch 60c for the wireless transmission unit 50. The reception unit 60 is provided in the truck loader crane CR. Specifically, the reception unit 60 is connected to the control device 70 in the cabin 11 of the truck loader crane CR.

The installation location of the reception unit 60 is not limited to the cabin 11 of the truck loader crane CR, and may be on a traveling body (also referred to as a vehicle) of a rough terrain crane. In the case of a rough terrain crane, since the cabin is at a high position, the storage location of the remote operation terminal can be set at a low position. In this case, the reception unit can be installed in or near the storage location of the remote operation terminal.

The LED 60a as display means displays information indicating that the strength of the radio wave does is equal to or less than a prescribed value, separately from the notifier 62. Specifically, the LED 60a emits light based on the radio wave strength alone, regardless of whether the PTO 30 is ON or OFF. Green light is emitted when the radio wave strength exceeds the prescribed value, and red light is emitted when the radio wave strength is equal to or less than the prescribed value.

With such display means, the operator can constantly check the LED 60a. Therefore, the LED 60a emits red light before the PTO 30 is turned OFF, so that the operator can recognize that the remote operation terminal 80 is far away and check the position of the remote operation terminal 80.

Furthermore, the reception unit 60 preferably has a pairing function for the wireless transmission unit 50, a battery warning function for the wireless transmission unit 50, and the like. Furthermore, it is also preferable to enable a smartphone to be used to check whether or not radio waves are transmitted from the wireless transmission unit 50.

PTO Detector

The PTO detector 36 detects whether the PTO 30 is ON or OFF. The PTO detector 36 sends the detection result to the determination section 61.

Determination Section

The determination section 61 (also referred to as a control section) is configured as a functional section of the control device 70, and determines whether or not the remote operation terminal 80 is mislaid. The determination section 61 receives detection information obtained by detection by the PTO detector 36 and the strength of the radio wave received by a reception section (not illustrated) of the reception unit 60. Based on these two input values, the determination section 61 determines that the remote operation terminal 80 is mislaid when the PTO 30 is OFF and the radio wave strength is equal to or less than a prescribed threshold value (for example, −95 dBm). The determination section 61 issues a notification command to the notifier 62 upon determining that the remote operation terminal 80 is mislaid.

The determination section 61 repeatedly performs the above determination at a prescribed time interval (for example, once in every 1.5 seconds) while the PTO 30 is in the OFF state. The determination section 61 may repeatedly perform the above determination at a prescribed time interval (for example, once in every 1.5 seconds) also when the work vehicle is traveling.

The prescribed threshold value is, for example, a value related to the reception strength with which whether or not the remote operation terminal 80 is in the cabin 11 of the work machine can be determined. Specifically, the prescribed threshold value is a value smaller than the minimum reception strength among the reception strengths of the wireless signal received by the reception unit 60 when the remote operation terminal 80 is in the cabin 11 of the work machine. For example, when the minimum reception strength is −90 dbm, the prescribed threshold value may −95 dbm. In this case, the determination section 61 determines that the remote operation terminal 80 is mislaid (in other words, the remote operation terminal 80 is not in the cabin 11) when the PTO 30 is OFF and the strength of the radio wave received by the reception unit 60 is −95 dbm or less. With such a prescribed threshold value, it can be determined with high accuracy that the remote operation terminal 80 is not in the cabin 11. Such a prescribed threshold value may be appropriately determined according to the size and the shape of the cabin 11.

Furthermore, the prescribed threshold value is, for example, a value of the reception strength of the wireless signal received by the reception unit 60, when the remote operation terminal 80 is outside the cabin 11 of the work machine (the work machine in a state where the door and the windows are closed) and is in the vicinity (for example, on the outer side surface of a door) of the cabin 11. With such a prescribed threshold value, it can be determined with higher accuracy that the remote operation terminal 80 is not in the cabin 11.

Notifier

The notifier 62 issues a notification when the determination section 61 determines that the remote operation terminal 80 is mislaid.

The notifier 62 installed in the cabin 11 receives a notification command from the determination section 61 and notifies the operator that the remote operation terminal 80 is mislaid. The notifier 62 includes a notification sound (voice or buzzer sound) and a notification display. Preferably, for example, the notification sound is a person's voice such as "you forgot the remote operation terminal" or a buzzer sound such as "buzz". Preferably, for example, the notification display is, for example, a message such as "you forgot the remote operation terminal" displayed on a monitor for a safety device, or is a dedicated notification lamp (red lamp or the like) installed.

Notification Stopper

The notification stopper 60b stops the notification by the notifier 62. Specifically, the operator operates the notification stopper 60b to cause the determination section 61 to forcibly determine that the remote operation terminal 80 is not mislaid to stop the notification by the notifier 62. Alternatively, it is also preferable to directly issue a command to the notifier 62 to stop the notification, by operating the notification stopper 60*b*.

Operation and Effect

Next, a flow of mislay prevention control by the system and the apparatus D for preventing the remote operation terminal from being mislaid according to the present embodiment will be described with reference to a flowchart in FIG. 6.

The PTO detector 36 constantly monitors whether the PTO 30 is ON or OFF, and when it is detected that the PTO 30 is switched OFF, detection information (OFF) is transmitted to the control device 70 (step S1). Thus, the mislay prevention control is executed at the timing when the PTO 30 is turned OFF.

Next, radio waves transmitted from the wireless transmission unit 50 at a prescribed time interval are received by the reception unit 60. Then, the determination section 61 determines whether or not the radio wave strength of the radio wave received by the reception unit 60 is equal to or less than a prescribed value (step S2). When the radio wave strength exceeds the prescribed value (NO in step S2), it is regarded that the remote operation terminal 80 is not mislaid, and the control is terminated.

Figure 6:
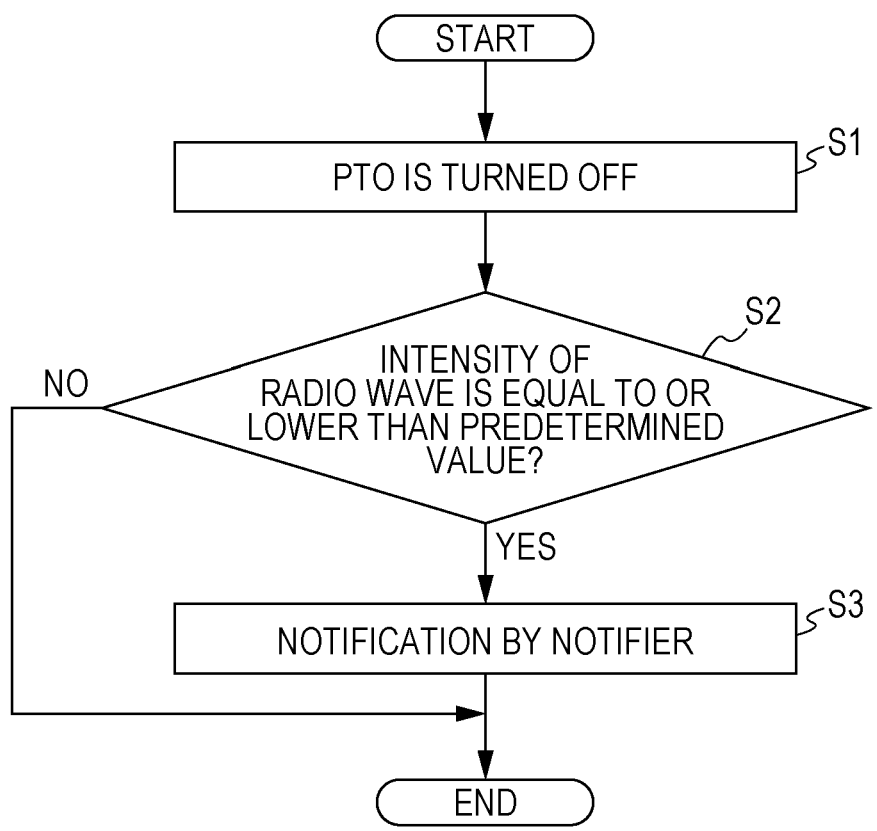
FIG. 6 is a flowchart illustrating a flow of mislay prevention control.

In step S2 in FIG. 6, even when the radio wave strength exceeds the prescribed value, the determination section 61 may repeat step S2 in FIG. 6 until a prescribed time elapses after the traveling of the work vehicle has started. According to such a configuration, it is possible to reliably detect a situation in which the remote operation terminal 80 is mislaid outside the cabin 11 and in the vicinity of the cabin 11.

Furthermore, even when the radio wave strength exceeds the prescribed value in step S2 in FIG. 6, the determination section 61 may continuously repeat step S2 in FIG. 6 while the work vehicle is traveling.

In step S2 in FIG. 6, when the strength of the radio wave is equal to or less than the prescribed value (YES in step S2), it is regarded that the remote operation terminal 80 is mislaid, and a notification command is issued to the notifier 62. Thus, when the strength of the radio wave is equal to or less than the prescribed value, the remote operation terminal 80 is estimated to be in a distant place, and thus is regarded as being mislaid. In step S2 in FIG. 6, even when the radio wave strength is equal to or less than the prescribed value, the determination section 61 may repeat step S2 in FIG. 6 until a prescribed time elapses after the work vehicle has started traveling. According to such a configuration, mislay of the remote operation terminal 80 can be detected more reliably.

The notifier 62 issues a notification to the operator upon receiving the notification command with the determination section 61 determining that the remote operation terminal 80 is mislaid (step S3). For example, an announcement "A remote operation terminal is mislaid. Please be careful." is broadcast from a speaker placed in the cabin 11. In this way, the mislay prevention control is executed.

Operation and Effect

Next, the effects of the system and the apparatus D for preventing a remote operation terminal from being mislaid according to the present embodiment will be listed and described.

(1) As described above, according to the apparatus D for preventing a remote operation terminal from being mislaid according to the present embodiment, the remote operation terminal 80 can be prevented from being mislaid. Furthermore, according to the system and the apparatus D for preventing a remote operation terminal from being mislaid according to the present embodiment, remote operation terminal 80 can be prevented from being mislaid even when the installation position of the remote operation terminal 80 is not defined in the vehicle.

In other words, with the system and the apparatus D for preventing a remote operation terminal from being mislaid according to the present embodiment provided, the remote operation terminal 80 can be prevented from being mislaid at a work site, an office, or home. As a result, the burden on the user due to the loss/re-purchase of the remote operation terminal 80 can be reduced. Furthermore, with the remote operation terminal 80 prevented from being mislaid, the work efficiency at the site can be prevented from being compromised. Furthermore, the wireless system can achieve a higher degree of freedom of arrangement, and a smaller number of installation steps.

(2) When the work vehicle is a truck loader crane CR or the like, the reception unit 60 can be installed in the cabin 11 of the truck loader crane CR. With this configuration, when the PTO 30 is turned OFF in the cabin 11, it can be recognized that the remote operation terminal 80 is mislaid. The same applies to truck cranes with no bed. Of course, the reception unit 60 can be installed in the cabin of other mobile cranes.

(3) Alternatively, when the work vehicle is a rough terrain crane (or all terrain crane) or the like, the reception unit can be installed on a traveling body of the rough terrain crane. Even in this case, the notifier 62 is preferably arranged in the cabin 11. With this configuration, when the PTO 30 is turned OFF in the cabin 11, it can be recognized that the remote operation terminal 80 is mislaid. This is particularly convenient for a case that a jib attachment/removal work for a large mobile crane is performed by a remote operation, because it is not necessary to climb up to the cabin to place the remote operation terminal 80. Of course, the reception unit 60 can be installed on a traveling body of other mobile cranes.

(4) The reception unit 60 further includes the notification stopper 60*b* for stopping notification by the notifier 62. With this configuration, it is possible to prevent the notification from being continuously issued, when the remote operation terminal 80 is lost. Thus, if the remote operation terminal 80 is mislaid, it is only necessary to issue the notification to the operator only for a while with the PTO 30 turned OFF so that he or she realizes the situation, and the configuration enables the notification to be stopped thereafter.

(5) Furthermore, the reception unit 60 is further provided with the LED 60*a* serving as display means for displaying information indicating that the strength of the radio wave is equal to or less than a prescribed value, separately from the notifier 62. Thus, the operator can always check the LED 60*a*. Therefore, the LED 60*a* emits red light before the PTO 30 is turned OFF, so that the operator can recognize that the remote operation terminal 80 is far away and check the position of the remote operation terminal 80.

The present embodiment has been described above in detail with reference to the drawings. Note that the specific configuration is not limited to this embodiment, and design changes that do not depart from the gist of the present invention are included in the present invention.

For example, in the present embodiment, the determination section 61 and the notifier 62 are described as components different from the reception unit 60. However, the present invention is not limited to this, and the determination section 61 and the notifier 62 may be integrated with the reception unit 60.

Figure 7:
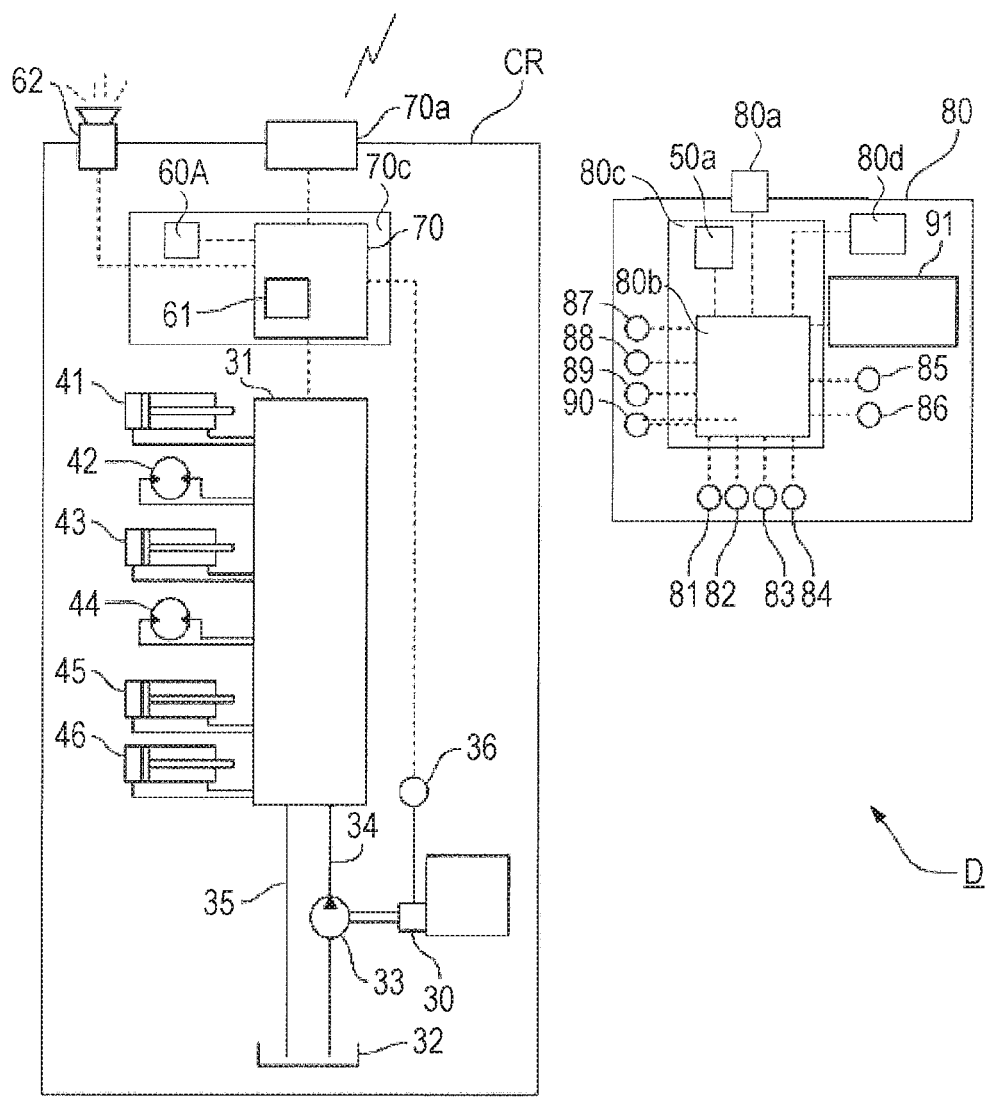
FIG. 7 is a block diagram of a control system for a truck loader crane according to a modification of the first embodiment.

FIG. 7 illustrates an example of a modification of the present embodiment. In the case of this modification, the reception unit 60A is mounted on a substrate 70c incorporated in the work machine as a wireless module. Note that the control device 70 of the work machine is also mounted on the substrate 70c. Such a reception unit 60A is connected to the control device 70.

In the case of the modification illustrated in FIG. 7, a wireless transmission unit 50a is incorporated in the remote operation terminal 80 as a wireless module. In this case, the wireless transmission unit 50a is accommodated in the housing 92 (see FIG. 3). Such a wireless transmission unit 50a is mounted on a substrate 80c in the housing 92. The control section 80b of the remote operation terminal 80 and the like are also mounted on the substrate 80c. The power source of the wireless transmission unit 50a may be a power source 80d (secondary battery or the like) shared with the remote operation terminal 80 (specifically, the remote operation section).

In the modification illustrated in FIG. 7, even when the power switch 85 (see FIG. 3) of the remote operation terminal 80 is OFF, the wireless transmission unit 50a transmits a wireless signal. The frequency of the wireless signal transmitted by the wireless transmission unit 50a is different from the frequency of the operation signal transmitted from the terminal side communication section 80a to the work machine.

In the case of the modification shown in FIG. 7, the wireless transmission unit 50a transmits a wireless signal when the power switch 85 of the remote operation terminal 80 is OFF, and does not transmit the wireless signal when the power switch 85 of the remote operation terminal 80 is ON. The wireless transmission unit 50a may constantly transmit a wireless signal at a prescribed time interval regardless of the state of the power switch 85 of the remote operation terminal 80.

As described above, in the above-described embodiment, the wireless transmission unit 50 has been described as a separate component that is retrofitted to the remote operation terminal 80. However, the present invention is not limited to this, and the wireless transmission unit 50 may be integrated with (built in) the remote operation terminal 80.

Furthermore, in the present embodiment, the reception unit 60 has been described as a separate component that is in wired connection with the control device 70, but the present invention is not limited to this, and the reception unit 60 may be integrated with the control device 70 instead of being externally provided.

Notes

An apparatus for preventing a remote operation terminal from being mislaid according to Reference Example 1 includes a work machine that is driven with power from an engine extracted via a PTO, a remote operation terminal for remotely controlling the work machine, a wireless transmission unit that is connected to the remote operation terminal and transmits a radio wave, a reception unit that receives the radio wave and is installed at any location of the work vehicle, a PTO detector that detects whether the PTO is ON or OFF, a determination section that determines that the remote operation terminal is mislaid when the PTO is OFF and an strength of the radio wave received by the reception unit is equal to or less than a prescribed value, and a notifier that issues a notification when the remote operation terminal is determined to be displaced.

In the apparatus for preventing a remote operation terminal from being mislaid according to Reference Example 1 described above, the work vehicle is a truck loader crane. The reception unit is installed in a cabin of a truck loader crane.

In the apparatus for preventing a remote operation terminal from being mislaid according to Reference Example 1 described above, the work vehicle may be a rough terrain crane. The reception unit is mounted on a traveling body of the rough terrain crane.

In the apparatus for preventing a remote operation terminal from being mislaid according to Reference Example 1 described above, the reception unit may further include a notification stopper that stops the notification by the notifier.

In the apparatus for preventing a remote operation terminal from being mislaid according to Reference Example 1 described above, the reception unit may further include display means that displays information indicating that the strength of the radio wave is equal to or less than the prescribed value, separately from the notifier.

The disclosures of the specification, drawings and abstract contained in the Japanese application of Japanese Patent Application No. 2017-087832 filed on Apr. 27, 2017 are incorporated herein by reference.

REFERENCE SIGNS LIST

CR Truck loader crane
D mislay prevention device
10 General-purpose truck
11 Cabin
12 Bed
13 Vehicle frame
20 Small crane
21 Base
22 Post (work machine)
23 Boom (work machine)
24 Hook (work machine)
25, 26 Outrigger device (work machine)
27 Group of levers
30 PTO
31 Hydraulic valve unit
32 Tank
33 Hydraulic pump
34 Main oil passage
35 Return oil passage
36 PTO detector
41 Boom expansion/contraction hydraulic cylinder (hydraulic actuator)
42 Winch hydraulic motor (hydraulic actuator)
43 Boom raising/lowering hydraulic cylinder (hydraulic actuator)
44 Rotation hydraulic motor (hydraulic actuator)
45, 46 Outrigger hydraulic cylinder (hydraulic actuator)
50 Wireless transmission unit
50a Wireless transmission unit
60, 60A Reception unit
60a LED (display means)
60b Notification stopper
60c Pairing switch
61 Determination section
62 Notifier 70 Control device
70a Work machine side communication section
70c Substrate
80 remote operation terminal
80a Terminal side communication section
80b Control section
80c Substrate
80d Power source
81 Swiveling selection switch
82 Raising/lowering selection switch
83 Winch selection switch
84 Expansion/contraction selection switch
85 Power switch
86 Horn switch
87 Navigation switch
88 Mode selection switch
89 Hook release switch
90 Hook retraction switch
91 Display section
92 Housing
95 Grip portion

The invention claimed is:

1. An apparatus for preventing a remote operation terminal from being mislaid, the remote operation terminal remotely operating a work machine driven via a Power Take-Off (PTO) device in a vehicle, the apparatus comprising:
a reception device, provided to the vehicle, that receives a wireless signal that is transmitted by a transmission device provided to the remote operation terminal, when the remote operation terminal is in a power OFF state, and is not transmitted when the remote operation terminal is in a power ON state;
a determination section that, when the PTO device is in an OFF state, determines whether a reception strength of the wireless signal received from the transmission device by the reception device is equal to or less than a prescribed threshold value; and
a notification section that issues a notification when the reception strength is equal to or less than the prescribed threshold value.

2. The apparatus for preventing a remote operation terminal from being mislaid according to claim 1, further comprising a display section that displays information related to the reception strength of the wireless signal received from the transmission device by the reception device.

3. The apparatus for preventing a remote operation terminal from being mislaid according to claim 1, wherein a frequency of the wireless signal is different from a frequency of an operation signal transmitted by the remote operation terminal to remotely operate the work machine.

4. The apparatus for preventing a remote operation terminal from being mislaid according to claim 1, wherein the prescribed threshold value is a value lower than the reception strength of the wireless signal received by the reception device, when the remote operation terminal is in a cabin of the work machine.

5. The apparatus for preventing a remote operation terminal from being mislaid according to claim 1 further comprising a PTO detection section that detects a state of the PTO device, wherein
the determination section starts the determination when the PTO detection section detects switching of the PTO device from an ON state to the OFF state.

6. The apparatus for preventing a remote operation terminal from being mislaid according to claim 1, wherein the determination section repeats the determination at a prescribed time interval, while the PTO device is in the OFF state.

7. A remote operation terminal for remotely operating a work machine driven via a Power Take-Off (PTO) device in a vehicle, the remote operation terminal comprising:
a remote operation section that includes an operation input section for inputting an operation instruction to the work machine, a control section that generates an operation signal based on the operation instruction input from the operation input section, and an operation signal transmission section that transmits the operation signal to the work machine; and
a transmission section that transmits a wireless signal at a frequency different from a frequency of the operation signal when the remote operation terminal is in a power OFF state, and does not transmit the wireless signal when the remote operation section is in a power ON state.

8. The remote operation terminal according to claim 7, wherein the remote operation section and the transmission section are connected to a common power source.

9. A system for preventing a remote operation terminal from being mislaid, the system comprising:
a remote operation terminal that remotely operates a work machine driven via a Power Take-Off (PTO) device in a vehicle;
a transmission device that is provided to the remote operation terminal, transmits a wireless signal when the remote operation terminal is in a power OFF state, and does not transmit the wireless signal when the remote operation section is in a power ON state;
a reception device that receives a wireless signal transmitted by the transmission device, the reception device being provided to the vehicle;
a determination section that, when the PTO device is in an OFF state, determines whether a reception strength of the wireless signal received from the transmission device by the reception device is equal to or less than a prescribed threshold value; and
a notification section that issues a notification when the reception strength is equal to or less than the prescribed threshold value.

10. The system for preventing a remote operation terminal from being mislaid according to claim 9, wherein the wireless signal is transmitted by one-way communication from the transmission device to the reception device.

* * * * *